Oct. 29, 1929. T. E. HAGGLUND 1,733,153
PULVERIZING ATTACHMENT FOR POWER PLOWS
Filed Nov. 17, 1927 3 Sheets-Sheet 3
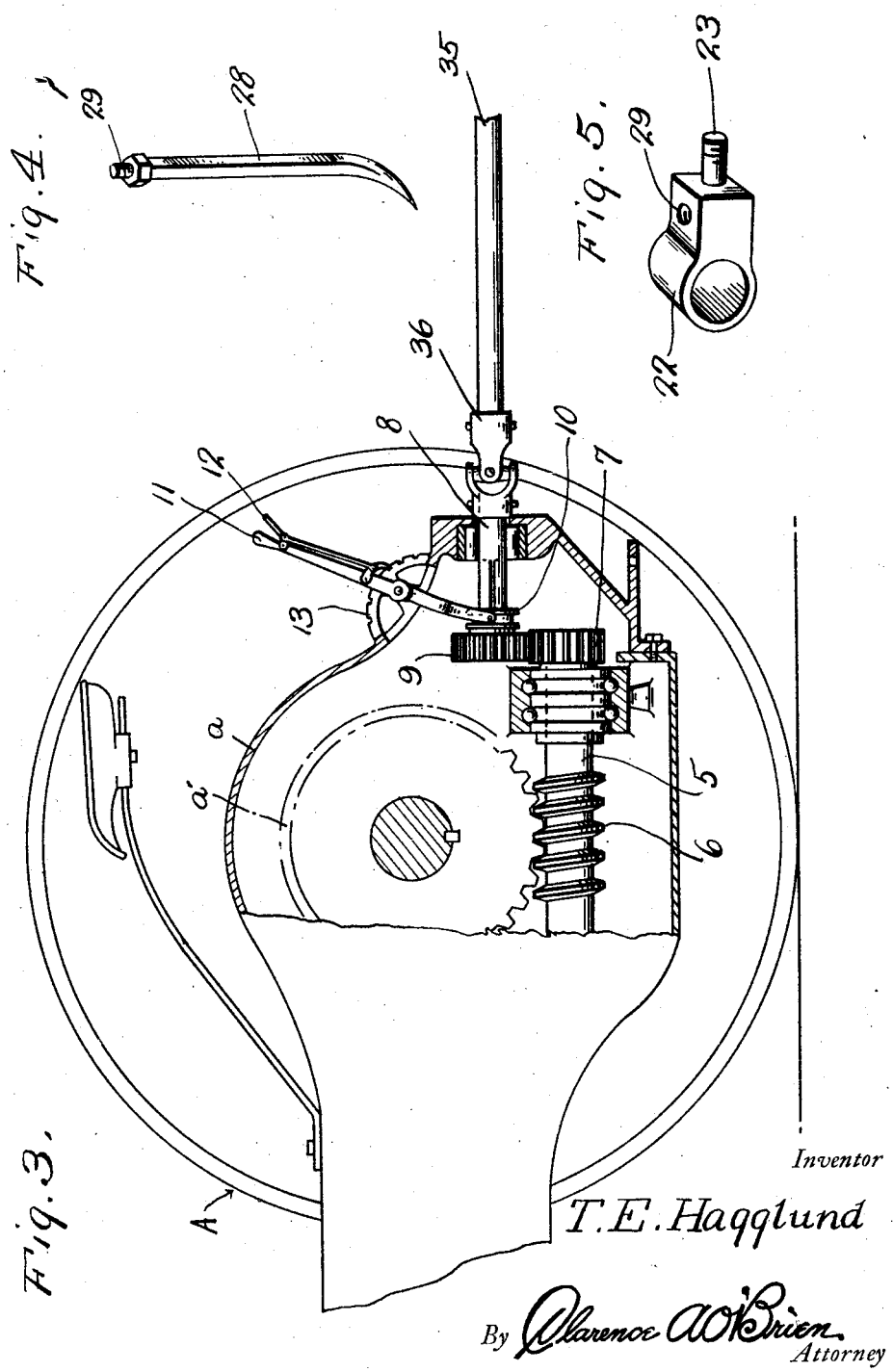

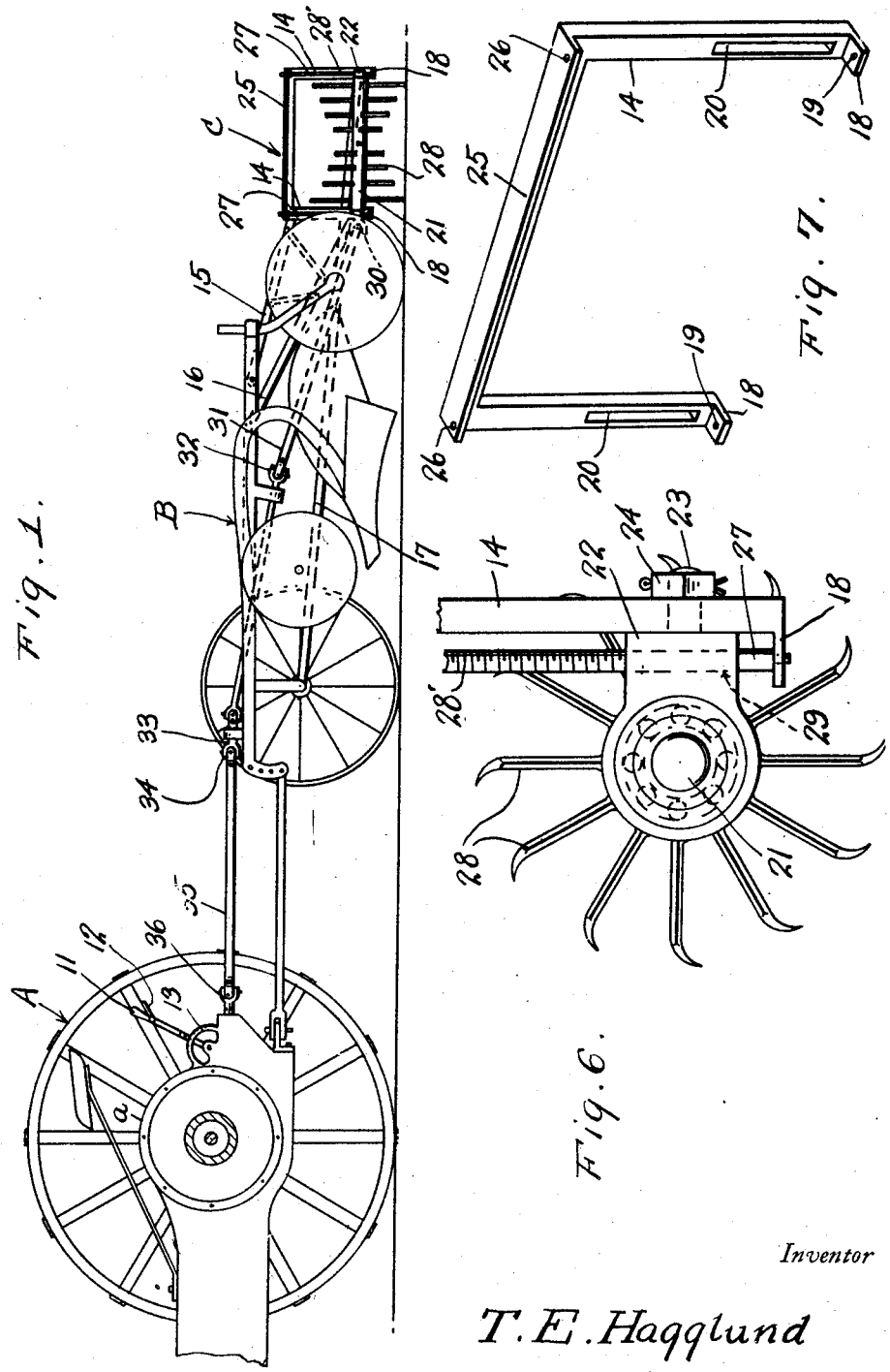

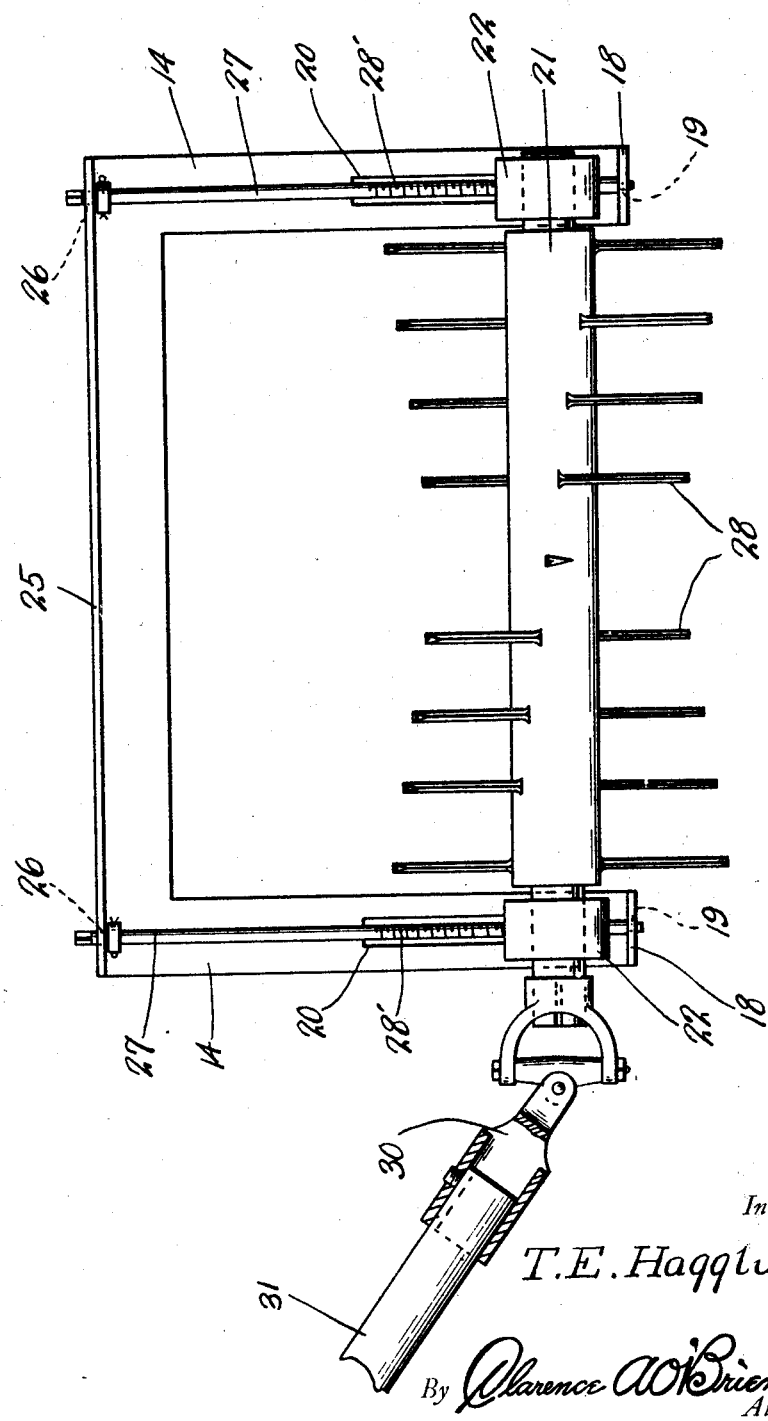

Patented Oct. 29, 1929

1,733,153

UNITED STATES PATENT OFFICE

TORSTEN EMANUEL HAGGLUND, OF CHICAGO, ILLINOIS

PULVERIZING ATTACHMENT FOR POWER PLOWS

Application filed November 17, 1927. Serial No. 233,905.

This invention relates generally to new and useful improvements in power plows, particularly those adapted to be driven by a tractor, and has more particular reference to a pluverizing attachment that is adapted to be disposed at the rear end of the plow, and to be operatively associated with the driving mechanism of the tractor so as to operate during the movement of the plow and tractor over the ground.

In carrying out the present invention means is provided for breaking up the dirt turned by the plow so that the field may be sown after the plowing operation without requiring any harrowing or other working thereof.

One of the most important objects of this invention is to provide a device of this character that may be associated with power plows of generally conventional design, and that may further be operatively connected to tractors of generally conventional design, and this without to any appreciable extent altering the construction of the plow or tractor.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a side elevation of a generally conventional power plow operatively associated with a tractor and to the rear end of which is attached my improved pulverizing mechanism, means being provided between the earth working unit of the mechanism per se, and the tractor to cause the operation of the unit simultaneously with the movement of the tractor.

Figure 2 is an elevation of the earth working unit, per se.

Figure 3 is an enlarged fragmentary section through the rear axle housing of a conventional tractor constructed to facilitate the operation of the earth working unit.

Figure 4 is a perspective of one of the teeth of the earth working unit.

Figure 5 is a perspective of one of the bearings for supporting the shaft of the unit upon a frame.

Figure 6 is a fragmentary end elevation of the earth working unit, and

Figure 7 is a perspective of the unit frame.

Now having particular reference to Figure 1 of the drawings, A designates generally a conventional tractor, B a conventional power plow, and C my pulverizing attachment. In carrying out the invention the rear axle housing $a$ of the tractor is equipped with a longitudinally extending stub shaft 5 suitably journaled at its opposite end beneath the main worm gear $a'$ of the tractor differential, which stub shaft 5 is provided with a worm 6 having mesh with the worm gear $a'$ with the end that the rotation of the worm gear $a'$ will cause the rotation of the shaft 5. The rear end of this stub shaft 5 is equipped with a spur gear 7 while suitably journaled through the back wall of the rear axle housing $a$ is a longitudinally extending stub shaft 8, to the inner end of which is splined a spur gear 9 adapted to mesh with the spur gear 7 when moved forwardly upon its shaft to the position indicated in Figure 3. This gear 9 is equipped at its inner face with a clutch collar 10 with which is associated the lower end of a hand lever 11, which hand lever extends upwardly through a slot in the housing $a$ and carries at its outer end a suitable detent 12 for cooperation with a toothed segment 13 whereby the gear 9 may be maintained either in or out of engagement with the spur gear 7 of the stub shaft 5.

The earth working unit per se of my said device consists of a somewhat elongated inverted U-shaped frame 14 that is arranged longitudinally at the rear end of the plow B and that is secured in horizontal manner to the rear end of the plow through the medium of suitable connecting bars 15, 16 and 17. The lower ends of the side legs of this frame 14 are provided with outwardly directed tongues 18—18 within each of which are openings 19. Said legs are futhermore provided with vertical slots 20—20. This earth working unit further consists of a shaft 21, the ends of which are journaled within bearings 22—22, the inner end of each bearing being formed with a threaded pin 23 that is engaged through the complementary slot 20 of the adjacent leg of the U-shaped frame 14. Threaded upon the pins 23 in back of the frame legs are nuts, one of which is disclosed in Figure 6 and designated by the reference character 24.

The upper bar of the frame 14 is formed with a flange 25 projecting in the same direction as the tongues 18—18. The ends of this flange being provided with openings 26—26 for registration with the openings 19 in said tongues 18, see Figure 7.

The earth working unit further consists of a pair of shafts 27—27 that are loosely arranged at their upper ends through the openings 26—26 in the flange 25 of the frame 14, the lower ends of these shafts being of reduced diameter and loosely arranged within the openings 19 of the tongues 18—18 of said frame 14 as clearly disclosed in Figure 2. These shafts 27—27 are threaded adjacent their lower ends as at 28 which threaded portions are arranged through vertical threaded bores 29 in the shaft bearing units 22. The upper ends of these shafts 27 project through the openings in the frame flange 25 and are squared so that the same may be turned by a suitable wrench. The purpose thereof being to raise or lower the bearings 22—22 of the shaft 21 for a purpose presently to be described.

Said shaft 21 is provided with radially arranged pulverizing teeth 28 which are relatively elongated as indicated in Figure 4. The outer ends of these teeth 28 are pointed and slightly curved so as to dig into the earth turned by the plow unit B. The inner ends of these teeth 28 are of reduced diameter and threaded as at 29 so that they may be threaded within threaded sockets of the shaft $w^1$ which will obviously permit the same to be removed for renewal or sharpening purposes.

The inner end of the shaft 21 projects through its bearing 22 and is connected through the instrumentality of a universal joint 30 with a shaft 31 that extends forwardly and upwardly of the plow unit B and this shaft being of sectional formation, the sections being joined by a further universal joint 32, see Figure 1. The forward end of this sectional shaft 31 terminates at the top of the frame of the plow B, and is universally connected to a stub shaft 33 journaled horizontally upon the forward end of the plow frame, the forward end of said stub shaft being universally connected as at 34 to a horizontal shaft 35 which extends forwardly toward the tractor A. The forward end of this shaft 35 is universally connected as at 36 to the projecting end of the stub shaft 8 arranged horizontally through the back side of the rear axle housing $a$ of the tractor A, as clearly indicated in Figure 3.

Obviously during the operation of the tractor the throwing of the gear 9 is to mesh with the gear 7 will rotate the shaftings leading to the earth working unit for obviously rotating the tooth carrying shaft 21 whereby the teeth will cut through the earth turned by the plow B for breaking up the same to permit the ground to be sown immediately following the plowing operation.

In view of the foregoing description when considered in conjunction with the accompanying drawings, it will be apparent that I have provided a highly novel, simple, and extremely efficient earth breaking up or pulverizing attachment for power plows that is well adapted for all the purposes heretofore designated, and even though I have herein shown and described the invention as consisting of certain detail structural elements it is nevertheless to be understood that some changes may be made therein without affecting the spirit and scope of the appended claims.

Having thus described this invention, what I claim as new is:—

1. An earth breaking or pulverizing unit comprising an inverted U-shaped frame, the ends of the leg portions of said frame being bent laterally to provide feet, the intermediate portion of the frame provided with a horizontal flange, a pair of bearing structures, a pair of threaded shafts each having its ends journaled through one foot and the flange and being threadedly disposed through one of the bearing structures, a shaft having its ends journaled within said bearing structures, and earth engaging elements on said shaft.

2. An earth breaking or pulverizing unit comprising an inverted U-shaped frame, the ends of the leg portions of said frame being bent laterally to provide feet, the intermediate portion of the frame provided with a horizontal flange, a pair of bearing structures, a pair of threaded shafts each having its ends journaled through one foot and the flange and being threadedly disposed through one of the bearing structures, a shaft having its ends jounaled within said bearing structures, and earth engaging elements on said shaft, and means in between each bearing structure and one of the leg portions of the frame for securing the said bearing structures against movement by the rotation of the threaded shaft disposed therethrough.

In testimony whereof I affix my signature.

TORSTEN EMANUEL HAGGLUND.